Patented Nov. 3, 1931

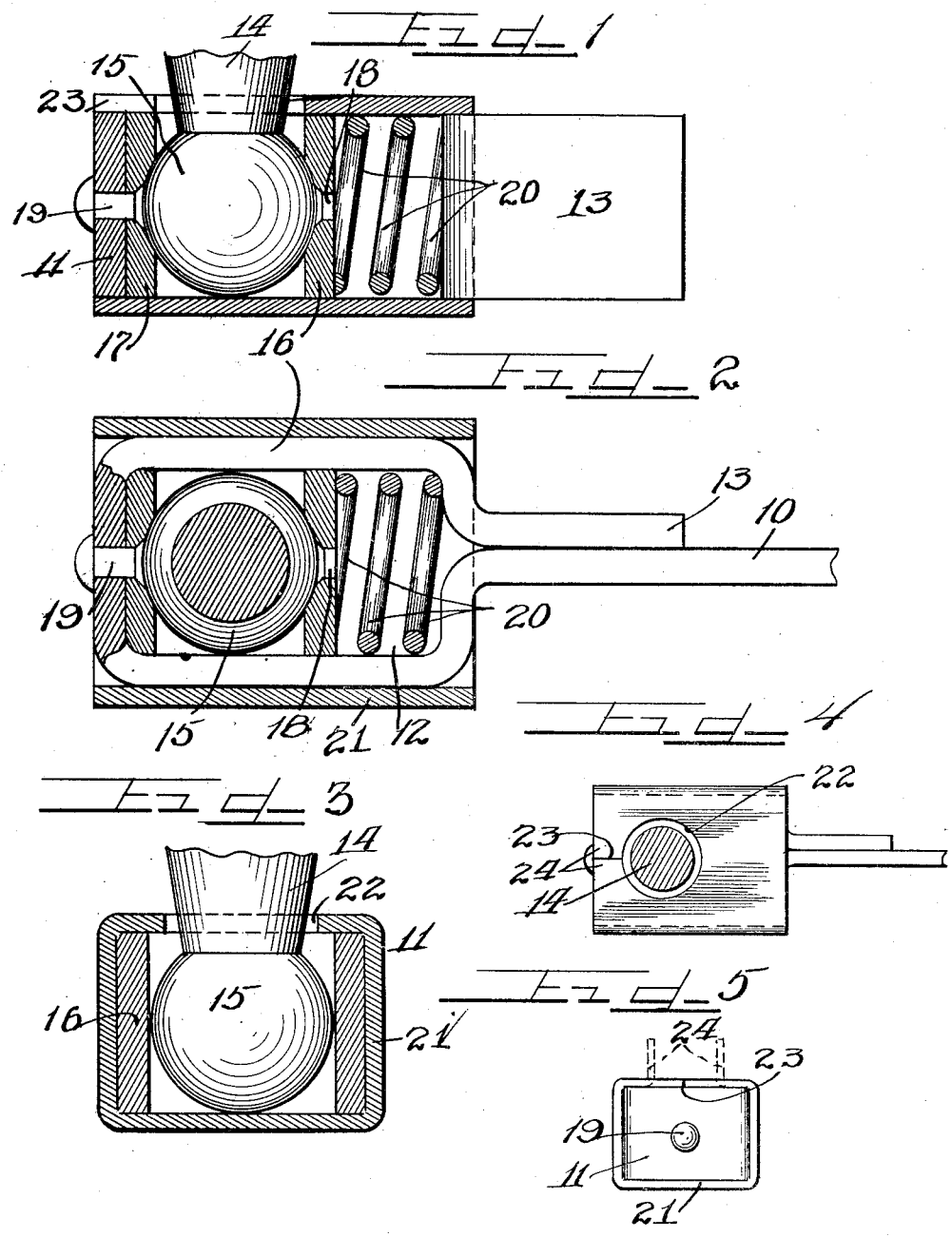

1,830,062

UNITED STATES PATENT OFFICE

GEORGE H. HUFFERD AND MATTHEW P. GRAHAM, OF DETROIT, MICHIGAN, ASSIGNORS TO THOMPSON PRODUCTS, INC., OF CLEVELAND, OHIO, A CORPORATION OF OHIO

SHOCK ABSORBER CONNECTING LINK

Application filed October 26, 1928. Serial No. 315,207.

This invention relates to shock absorbing ball joints and connecting links such as are used for linking together the various parts of the steering mechanism of automotive vehicles and the like.

It is a general object of this invention to provide an improved device of the class described embodying a simplified structure that can be cheaply constructed and will be safeguarded against accidental separation in service.

It is also an object of this invention to provide a ball joint connecting link so simplified in form as to be capable of being manufactured by bending strip material thus forming the two joints of a tie rod, for example, out of a plain strip with only simple bending operations followed by spot welding. The advantage of such a construction lies in the simplicity and speed of production of the manufacturing processes involved as compared to tubular or forged tie rods.

It is another object of this invention to provide a simple form of dust shield and housing for the ball joints that will be held in place by the ball stud and will in turn prevent an accidental separation of the joint in service.

It is a further object of this invention to provide a simplified form of ball seat and mounting therefor that will assure adequate support and lubrication for the bearing surfaces while having the ability of absorbing shocks.

Other and further important objects of this invention will be apparent from the disclosures in the specification and accompanying drawings.

The invention (in a preferred form) is illustrated on the drawings and hereinafter more fully described.

On the drawings:

Figure 1 is a longitudinal vertical section through a ball joint incorporating the features of this invention.

Figure 2 is a horizontal section similar to Figure 1.

Figure 3 is a vertical cross section through the joint, the ball stud being shown in elevation.

Figure 4 is a top view of the completed joint with the ball stud in section.

Figure 5 is an end view of the joint showing in dotted line the open position of the cover lugs.

As shown on the drawings:

The connecting link is formed from a bar 10 of rectangular cross section both ends of which are similarly bent and offset at 11 to inclose the sides of a rectangular space 12 forming the housing proper for a ball joint, the free end 13 of the bar 10 returning alongside the shank of the bar and being suitably secured thereto, preferably by spot welding.

The ball joint proper is formed by a stud 14 secured to the part to be controlled, the stud being formed with a ball end 15 which bears between a pair of ball seat members 16 and 17 both of which are centrally drilled and counterbored as indicated by the numeral 18. The hole 18 so formed in the right hand member 16 serves to admit lubricant to the bearing surfaces while the hole in the left hand member 17 is occupied by a rivet 19 extending through the end portion of the housing 11. The seat member 16 is free to move in the housing space 12 and is backed up by a coil spring 20 which is adapted to yield under compressive shocks.

The structure so far described may be termed a shell open at both top and bottom. A closure 21 of rectangular section is adapted to slip over the housing 11 and is provided with an aperture 22 large enough to allow some play for the neck of the ball stud, but too small to permit passage of the ball 15. In order to permit insertion of the ball a slit 23 is made in the closure from the aperture to the nearest edge and the two ears 24 so formed are bent upwardly as indicated by the dotted lines in Figure 4 so that the closure can be slid into position about the ball stud, after which the ears are turned down again thus holding the ball stud in position while the stud in turn prevents the closure from sliding relative to the housing.

The connecting link is preferably intended to be assembled with the ball studs as a factory proposition, because of the trouble proof characteristics of the joint. Starting with the bar 10 having the housings 11 formed therein the left ball seat 17 is riveted in place and the closure 21 is then slid over the housing to a point to the right of its final position. The spring 20 and right ball seat 16 are then assembled together with the ball 15. Next the closure 21 is slid back to the left until the aperture 22 is aligned with the neck of the ball stud, and finally the upstanding ears 24 are bent down into the plane of the top of the closure.

In use, the closure is free to slide to the right should a shock force the ball stud in that direction to an extent exceeding the clearance at the aperture 22. However, the link is rigid in tension, so that in normal installation behind the axle of a vehicle, the wheels are rigidly held against toeing in but are yieldingly held against spreading. As the natural effects of non-center point wheel mountings are to cause spreading of the wheels, the yielding resistance to such spreading is advantageous, as it provides a shock absorber action.

We are aware that numerous details of construction may be varied through a wide range without departing from the principles of this invention, and we therefore do not purpose limiting the patent granted, otherwise than necessitated by the prior art.

We claim as our invention:

1. A connecting link comprising a bar bent at an end into the form of an open rectangular housing, a ball joint connection mounted in said housing, a closure for said housing adapted to envelop and slide thereon, said closure having an aperture for the projecting part of the ball joint.

2. A connecting link comprising a bar bent at an end into the form of an open rectangular housing, a ball joint connection mounted in said housing, a closure for said housing adapted to envelop and slide thereon, said closure having an aperture for the projecting part of the ball joint and a slit extending from said aperture to one edge of said closure whereby to form ears adapted to be bent to permit sidewise insertion of the projecting part of the ball into said aperture.

3. A device of the class described comprising a bar having one end bent into the form of a rectangular housing, a ball seat secured to said housing inside the outer end wall of the housing, a ball of a ball stud positioned within said housing, a second ball seat engaging the ball of said stud, a spring positioned between the second ball seat and the end of the housing opposite the first ball seat, and a closure enveloping and closing said housing.

4. A device of the class described comprising a bar having one end bent into the form of a rectangular housing, a ball seat secured to said housing inside the outer end wall of the housing, a ball of a ball stud within said housing, a second ball seat engaging said ball, a spring positioned between the second ball seat and the end of the housing opposite the first ball seat and a closure enveloping said housing and having an aperture adapted to receive the neck of said ball stud.

5. A connecting link comprising a bar of rectangular cross section bent at an end into the form of a rectangular housing, a ball joint mounted in said housing, and a slidable closure for said housing.

6. A connecting link comprising a bar, a loop on an end of the bar and integral therewith forming a housing, a ball joint connection within said loop with a portion protruding therefrom and a closure for said housing slidably mounted on said loop and having an aperture for the protruding portion of said ball joint connection.

7. A connecting link comprising a bar, a loop on an end of the bar and integral therewith forming a housing, a ball joint connection within said loop with a portion protruding therefrom and a closure for said housing slidably mounted on said loop and having an aperture for the protruding portion of said ball joint connection, said closure having a slit extending from one end thereof to said aperture to provide ears that may be bent outwardly to permit assembly of said ball joint within said housing and that may thereafter be bent back into closing position.

In testimony whereof we have hereunto subscribed our names at Detroit, Wayne County, Michigan.

GEORGE H. HUFFERD.
MATTHEW P. GRAHAM.